Sept. 15, 1931.  J. A. B. SMITH  1,822,938
TYPEWRITING MACHINE
Filed Sept. 21, 1928   3 Sheets-Sheet 2
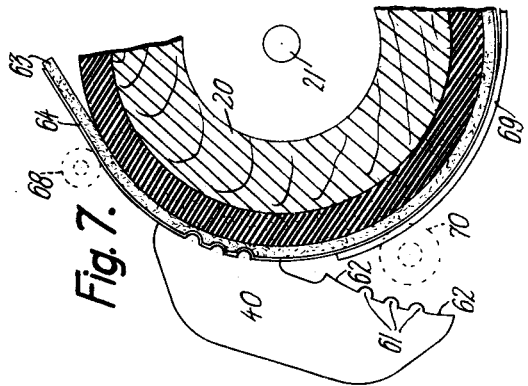
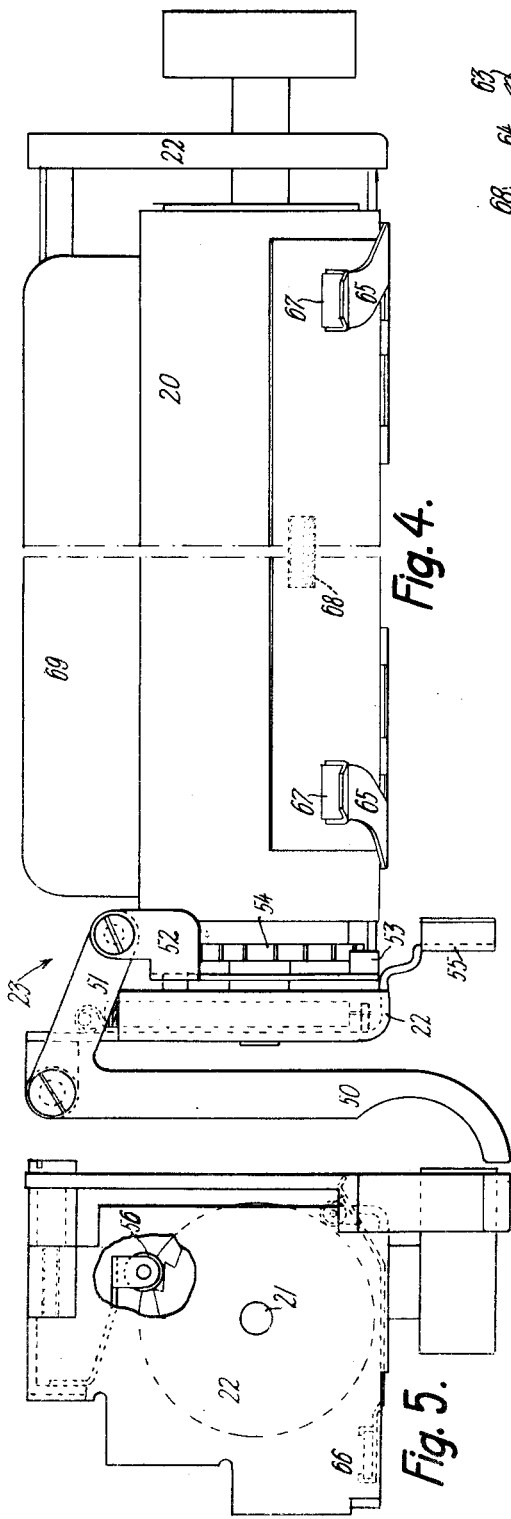
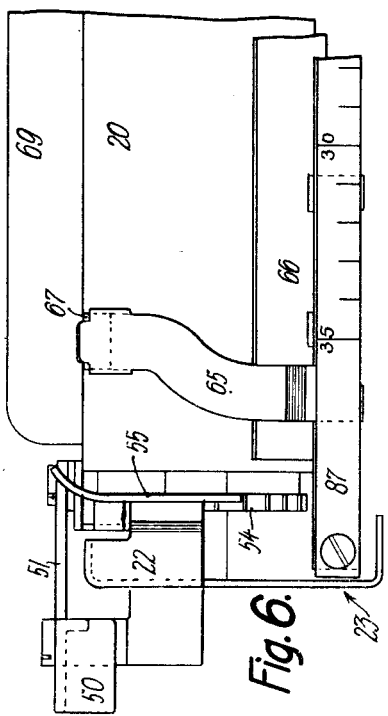
Inventor:
Jesse A B Smith
by B C Stickney
Attorney.

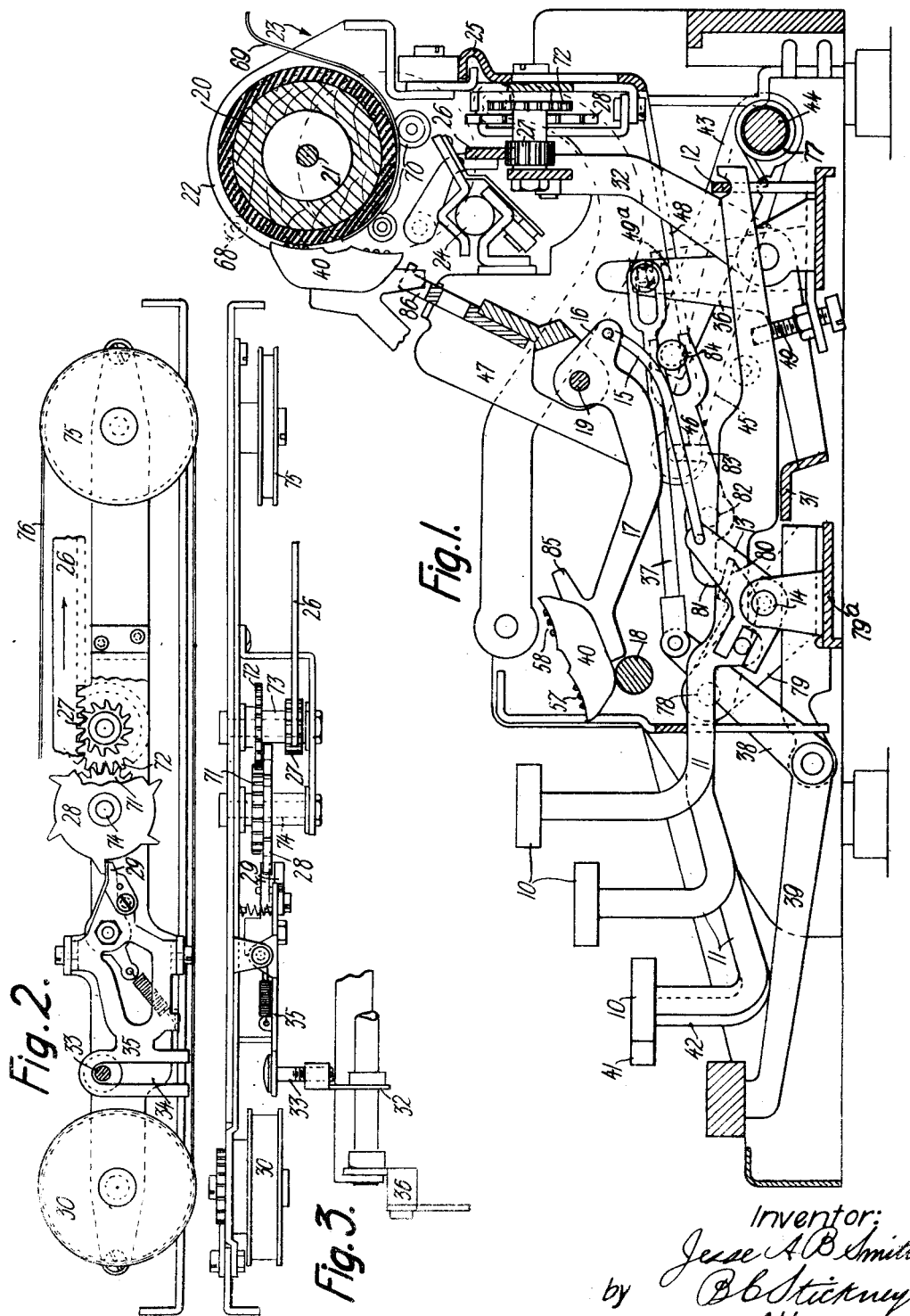

Sept. 15, 1931.    J. A. B. SMITH    1,822,938
TYPEWRITING MACHINE
Filed Sept. 21, 1928    3 Sheets-Sheet 3
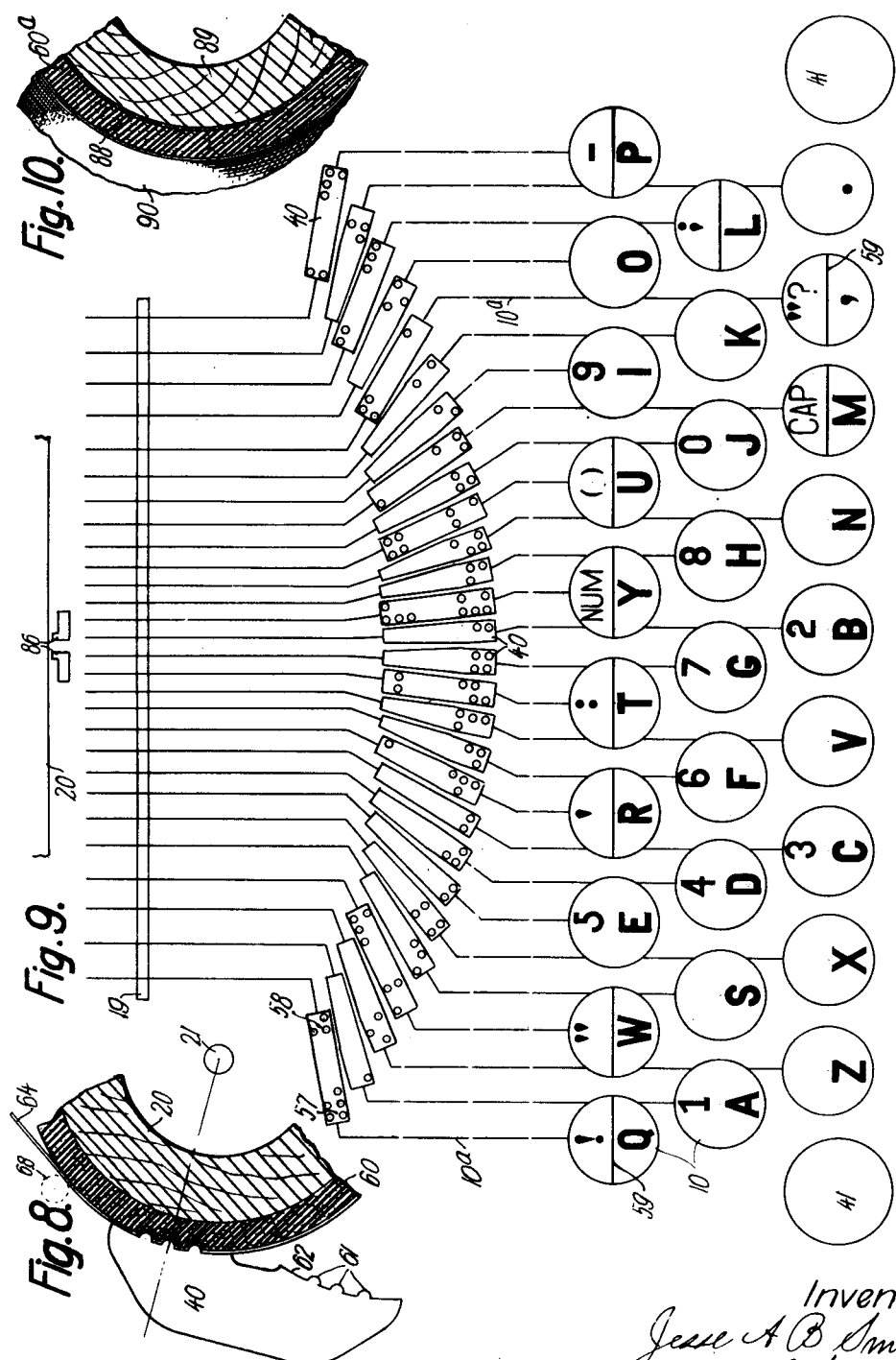

Patented Sept. 15, 1931

1,822,938

UNITED STATES PATENT OFFICE

JESSE A. B. SMITH, OF STAMFORD, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed September 21, 1928. Serial No. 307,361.

The present invention aims mainly to produce a simple, inexpensive machine by which the Braille system of pin-point characters may be selectively embossed upon a worksheet through the manipulation of keys by an operative not versed in the Braille system, especially by the use of the well-known type writer keyboard, whereby is produced an entire Braille character upon the operation of any key.

A feature of the present invention is to enable those having no knowledge of the Braille system but having occasion to correspond with persons afflicted with blindness, or to copy ordinary printed books into the Braille system, to purchase such a machine at nominal cost. To this end, it is purposed to use as a base certain well-known features of the Underwood portable typewriting machine, preferably the three-bank, having twenty-eight keys; and by typing without ribbon upon the back of the work-sheet, and reversing the direction of carriage-feed, and by providing the type-bars with unreversed embossing types, and other contrivances, readily converting this inexpensive typewriting mechanism, with its standard keyboard, into a novel character-embossing machine for the Braille alphabet, readily usable by any typewriter operator.

Other features and advantages will hereinafter appear.

In the accompanying drawings,

Figure 1 is a full-size central vertical section of a three-bank Underwood portable visible typing machine.

Figures 2 and 3 are front and plan views, respectively, of the carriage-feeding unit removed from the frame of the machine, the parts being rearranged for the Braille system by changing the direction of carriage-feed towards the right.

Figure 4 is a plan view of the platen-carriage, line-spacing and paper-feeding mechanisms.

Figures 5 and 6 are an end view and a partial front elevation, respectively, of Figure 4.

Figure 7 is an enlarged end view of a section of the platen having the usual hard surface for typing, with a sheet of spongy material as blotting paper employed as a backing sheet for a work-sheet to be embossed by the typing elements.

Figure 8 is a view similar to Figure 7, except that the platen is covered with a soft resilient rubber coating, and which surface in backing up the work-sheet to be embossed is displaced by the characters in embossing the work-sheet, and then resumes the original smooth cylindrical face after the impact of the types.

Figure 9 is a diagrammatic plan view of a standard three-bank keyboard and the associated type-bars with their type-heads arranged in basket-formation.

Figure 10 is a perspective view of a further modification of the platen-structure where the pliable sheath of the platen is covered with a thin silken surface for the embossing types to strike against.

The basis of the drawings is a machine having the general characteristics shown in the patent to George W. Campbell, dated March 9, 1920, No. 1,332,972, where the keyboard consists of twenty-eight character-keys assembled in three banks. Certain features of the invention are adapted for use with four-bank machines, either portable or standard. Each type-key 10 depresses a key-lever 11 fulcrumed on a bar 12, to vibrate a bell-crank 13 about its pivot 14, to transmit a pull to a link 15 having a pivotal connection to a short arm 16 of a type-bar 17 to lift the bar from its rest or basket 18 upwardly and rearwardly about a fulcrum 19 to strike the front face of a platen 20 mounted upon a shaft 21 having bearings in ends 22 of a carriage 23 feeding from left to right upon a front ball-bearing raceway 24 and a roller-supporting ledge 25 at the rear of the carriage. The carriage is provided with a carriage-feed rack 26 engaging with a pinion 27 which rotates an escapement-wheel 28 to co-operate with escapement-dogs 29 to letter-space the carriage to the right under tension of a spring-drum 30 which is connected to drive the carriage to the right. The depression of each key-lever 11 vibrates a universal bar 31 having an arm 32 adjustably connectible by a screw 33 which is engageable within a slot 34 of an escapement-dog-rocker 35, to vibrate the rocker and alternately engage and disengage the dogs 29 with the teeth of the escapement-wheel 28, as each character is typed. The universal bar 31 further includes an arm 36 connectible with the rear end of a link 37 having a forward connection to a crank-arm 38 forming a part of a space-bar frame 39 operative to space the carriage by vibrating the universal bar 31.

Each type-bar 17 has secured thereto a type-head 40, and certain of these type-heads have each two type-faces, of different characteristics, to emboss different characters when the carriage and platen are case-shifted by suitable keys 41, usually arranged at both sides of the keyboard to be depressed by either hand. Each shift-key 41 includes a lever 42 operative to vibrate an arm 43 secured to a rock-shaft 44 having side arms 45 and a stud-and-slot connection 46 to each side wall 47 of the carriage-shift frame, to lower and raise a ledge 48 formed in the lower edges of said side walls between stop-screws 49 and 49$^a$ suitably mounted upon the machine-frame. The platen is normally in raised position.

The line-spacing mechanism may be similar to the construction shown in the patent to Campbell, dated September 26, 1922, No. 1,430,356, which briefly includes a line-space lever 50, pivotally mounted upon the left-hand carriage-end 22 formed with an arm 51 connected to a slide 52 formed with a tooth 53, which, by a reciprocable movement of the lever 50, engages the teeth of a line-space ratchet-wheel 54 secured to the platen-end. The carriage-end 22 may be formed with a stationary finger-piece 55 and the operation of the lever 50 to line-space the platen provides for the lever 50 and finger-piece 55 being pinched between the finger and thumb to double-line-space the platen against a platen-detenting roller 56, when the carriage is being returned to the left to begin a new line of embossing.

For the purpose of the present invention, the type-heads 40 are provided with paper-pitting rounded-tip types 57 and 58 indicating upper and lower case-shift types, respectively, operative in striking the back or rear face of the work-sheet to pit the sheet and form corresponding points raised or in relief upon the front or reading face of the sheet of sufficient distinctness which would be decipherable by the sense of touch of a blind reader's fingers.

In the Braille system there are twenty-six characters for the alphabet and the ten numerals. The first ten letters of the alphabet use the same character as the ten numerals 1 to 0. As there are twenty-eight keys in the keyboard, the comma and period are arranged to occupy the two extra keys. The capital and number-sign characters, and the punctuation-mark characters, are all placed at the shift or abnormal positions on certain type-heads 40. Certain of the keys 10 are combination keys, indicating both a letter and a numeral, but are not case-shift keys; see the combination-keys E, I, A, D, F, G, H, J, C, B, each of which is connected to a single-character type. Other combination-keys, that include the punctuation characters, are case-shift keys, and these combination-keys are designated by horizontal key-lines 59 separating the alphabetical from the special characters. These last combination-keys are Q, W, R, T, Y, U, P, L, M, and are usable with the shift-key as required.

The twenty-six letters of the embossing alphabet are arranged in a standard basket-assembly, with alphabet and numeral characters positioned at the upper end of the type-heads. The few punctuation characters are positioned at the lower ends of the heads. Those heads that have no lower characters assigned to them may be tapered, to give room for and avoid interference with other types in the basket. This arrangement is shown at Figure 9 where each type-head 40 is diagrammatically joined by a broken line 10$^a$ to its associated key 10, and the relative assembly of double and single character type-heads is shown in correct relation.

It is proposed to back up the sheet with very soft rubber or other suitable covering for the platen, as indicated at 60, Figure 8, so that the embossing type-points 61, in pitting the paper, will upset the paper and imbed it into the face of the platen. The resistance and yielding of the material of the platen-face will cause the paper to hug and conform to the form of the points. This construction of the pits in the paper is further promoted by an arcuate base-line face 62 that fits the face of the platen, and tends, by pressure around the dots, to preserve sharper corners where the walls of the pits sink into the face of the platen, and thus render the Braille point-formations more pronounced, and more readily detected by the fingers. Said face 62 is so extensive as to form a final stop for the type, as it abuts against the back of the work-sheet and prevents undue sinking of the points into the work, even where the type has only a single point thereon.

The stops 62 are gages which cause evenness in the height of the embossings throughout the page, conducing to ease in reading the page by the fingers. The line or profile of the type at 61, conforms to the cylindrical contour of the platen (see upper type at Figure 7), so that all embossings may be level or of uniform height above the surface of the typed sheet.

Another method for embossing upon a work-sheet by the types is shown at Figure 7, where a backing sheet 63 of ordinary blotting paper, the size of the work-sheet 64, is used, the sheets being adjusted and fed together around the platen, which may be the usual hard platen commonly used in ink-typing. The impinging of the types against the outer work-sheet imbeds the dots and paper in the blotter or other soft sheet, and the inherent resistance of the soft sheet against displacement by the dots forces the paper to conform to their contour.

It will be understood that the type-heads are extra large and heavy, which tends to add impetus in forcing the indentation of the pit-forming bosses into the paper and the underlying matrix, and this flexibility of the sheet-backing substance promotes formation of the raised dots without rupturing the work-sheet.

To hold the work-sheet upon the platen during the line-spacing thereof, paper-fingers 65 are adjustably secured at each of the platen to a carriage-bar 66, and each finger may carry a roll 67 to bear upon both side edges of the sheet outside the printing surface, so as not to iron the points typed, and the sheet may further be held in position by the usual center roll 68, to prevent the typed sheet from bulging forwardly from the platen at the embossing line, and to cause the sheet to hug the platen at this point.

The sheet may be adjusted at a rear paper-table 69, and passed forwardly around the platen under regulation feed-rolls 70. To prevent these rolls 70 from ironing out the character-embossed sheet (if for any reason the sheet should require readjusting around the platen for a correction) said rolls may be positioned to press only along the unembossed side edges of the sheet similarly to the roll 67.

The typing through the back of the sheet to emboss characters in relief upon the front face thereof requires that the successive characters be letter-spaced leftward from the right-hand margin of the sheet, so that when the sheet of embossed characters is turned over to face the reader, the characters thereon will be deciphered rightward from the left-hand margin in the usual manner of reading.

To provide a wide letter-space for a greater separation between the finger-decipherable characters the usual twelve-toothed wheel 28 has the teeth all removed except every third tooth, to reduce the number of teeth to four. The machine embosses four characters to the inch.

To maintain the usual rotary direction for the escapement-wheel 28 against the dogs 29, a reversing train is used. The wheel 28 may be provided with a gear 71 driven by a similar gear 72 secured to a sleeve 73 carrying the usual pinion 27 driven by the feed-rack 26. This removal of the pinion 27 from an escapement-wheel shaft 74, and mounting it as an intermediary between the rack and the escapement-shaft, maintains the usual direction of rotation for the escapement-wheel, even though there is a reverse feeding of the carriage. This is indicated by the arrow in Figure 2.

The reversal of the direction of the carriage-drive, without reversing the direction of the spring in the motor-drum 30, may be preserved by introducing an idler pulley 75 with a tape 76 passing from the drum 30 across the machine over the pulley 75 and thence recross the machine, with the free end secured to the left end of the carriage in a well-known manner. With these simple changes the well-known typing mechanism may be converted to provide reverse carriage-feeding direction required for the typing of the Braille characters according to this invention.

As shown at Figure 9 the alphabet and numeral characters are assembled at the outer end of all the type-heads 40 to strike the platen at the usual upper-case position; and such characters as are only used occasionally are assembled upon the lower ends of some of the type-heads 40. It is provided in the present invention that the normal case-shift position of the carriage is at the usual top or so-called "upper-case" position against the stop-screw 49ª, and is resiliently held in this position by a spring 77 coiled about the shaft 44 with one end hooked under the arm 43, and the other end secured to the frame in a suitable manner. Depression of a shift-key 41 depresses the carriage from the position of the stop-screw 49ª to the lower stop-screw 49. The shift-key-lever 42 is pivotally suspended upon a pivot 78 arranged at the upper end of a bracket 79 secured to a cross-bar 79ª. The rear end of said lever 42 terminates at a bent-over ear 80 to provide a wide bearing face suitable to engage the end of a short arm 81 of a lever pivoted at 82 to the side frame of the machine and formed with a long arm 83 having a slotted end to engage a stud 84 secured to the free end of the arm 43, which, it will be remembered, is secured to the shaft 44. The depression of the shift-key through these connections effects the down shift of the carriage and platen to receive the impact of the special type-faces 58, while the key is held depressed. The carriage is immediately restored by the spring 77 when the key 41 is released. The shift-key and its connections may be duplicated at the sides of the key-system.

It being assumed that the platen-surface has a soft, pliable texture, the work-sheet fed around it and the carriage placed to the left against any suitable form of marginal stop, the typing of the Braille characters begins with a symbol-character for a capital letter, which is typed while the shift-key is held down. A sharp impact of the type against the paper is not advocated as the most effective mode of operation for upsetting or embossing the characters over the pit-forming types. Rather, it is recommended that the finger follow the key to the bottom, and that a certain pressure be exerted upon the key at the end of the key-stroke. This reduces or avoids danger of fracturing the paper in some cases. The work-sheet may, if desired, be first subjected to a dampening process, well known in the printer's art, whereby the paper will more readily conform to the embossing process. It will be understood that upon the release of the shift-key the platen will be restored to its normal position, and upon the release of the capital character-key the type-bosses will be withdrawn from the paper, the depressed face of the platen will recover its smoothness, and the carriage-feeding mechanism will letter-space rightward to position for embossing the first alphabetical character.

At the end of the line that has been embossed the pinching of the line-space lever 50 and the finger-piece 55 line-spaces the platen and work-sheet, and also provides the means for returning the carriage leftward to the initial marginal position for embossing the next line.

It will be noted that each type-bar 17 is formed with a usual bar-aligning tongue 85 that engages a usual centering guide 86, the guide 86 also including a pointer to indicate upon a front scale 87 of the carriage the typing position on the work-sheet, the numbered graduations on the scale being reversed from normal because of the reversed direction of the carriage-feed.

The rubber sheath of a cylindrical platen is usually formed by vulcanizing rubber upon a cloth lining to provide a binder for the rubber and also provide an inner surface whereby the sheath may be permanently cemented to the wooden core. The preferred form of platen shown at Figure 8 may be similarly constructed, but the rubber sheath is exceptionally soft and pliable for embossing. Preferably the platen is made as shown at Figure 10, where a very soft rubber sheath 60ª is vulcanized not only with an interior binder cloth 88 to be cemented to a wooden core 89, but the outer surface of the soft rubber is also covered by a thin woven sheet of silk 90, very finely and closely woven, vulcanized into the face of the rubber as a highly flexible but strong backing face for the work-sheet to be embossed thereagainst. The silk covering or coating of the sheath serves as a surface binder, and as a printing or embossing member, and this surface will resist the puncturing of the pin-points for a longer period of time, and, owing to its toughness, will also minimize or avoid rupturing of the work-sheet by the types. Said sheathing 90 is very tough and not apt to be ruptured by the types, and aids in saving the work from being ruptured.

From the above description, it will be noted that a well-known typing mechanism is converted to perform an embossing operation to bring out the point characters in relief by striking the back of the work-sheet; that all the alphabet and numeral Braille characters are selectively embossed upon a work-sheet by a key-driven type-bar system consisting of only twenty-six typing elements, without recourse to a case-shifting movement, and each type-bar having a full characterization of a Braille symbol; that each embossing type-bar carries the Braille bosses in relief; that the embossing penetration of these bosses is limited by the face of the gage on the type-head striking the work-sheet; that the face of the gage may be flat to conform to a flat platen or may be concaved to fit upon the convex face of a cylindrical platen, in either case the effect of the impact of the face of the head against the platen is to flatten out any distortion of the work-sheet caused by the embossing action of the prior contact of the points against the paper; that the pliability of a rotary platen-face forms a perpetual matrix for promoting characters in relief, the paper-embossing indentations of the matrix immediately closing up after the withdrawal of the paper-indenting of the types; that a plurality of thin, specially-prepared work-sheets may be embossed as a unit and thus provide manifold copies; and that the surface of the soft, pliable platen sheath may be reinforced by a thin silken fabric vulcanized into the face of the rubber to serve as a binder for the rubber and localize the displacement of the rubber face under the impact of the types in embossing the work-sheet, and also lengthen the life of the platen-face against the effect of the puncturing of the types.

The three-row portable typewriter is usually provided with three types on each bar, and the platen usually has three printing positions. By the present conversion, the middle case-shift position is eliminated, and only the top and bottom case-positions are used. This affords ample room on the type-bars for the large embossing types and for the still larger type-bar arresting surfaces or hilts 62. The usual type-bar arresting anvil or "stop ring" is omitted.

Variations may be resorted to within the scope of the invention, and portions of the improvements may be used without others.

Having thus described my invention, I claim:

1. An outer cover for a cylindrical embossing platen for type-elements, including a soft, pliable sheath of rubber re-enforced by a fabric vulcanized into the embosing face of the sheath.

2. An outer cover for a cylindrical embossing platen for type-elements, including a soft, pliable sheath of rubber re-enforced by a woven silken fabric vulcanized into the face of the sheath to re-enforce the face thereof against unnecessary displacement by the embossing type-elements.

3. An outer cover for a cylindrical embossing platen for type-elements, including a soft, pliable sheath of rubber re-enforced by a woven silken fabric vulcanized into the face of the sheath to localize the displacement of the sheath to the area of the embossing type-elements.

4. The combination with a key-driven set of embossing independently movable Braille type-heads having unreversed characters in relief, of a cylindrical platen having a matrix-forming surface to co-operate with the unreversed types to emboss the back of a work-sheet to form on the front of the sheet raised characters agreeing with the types, the profile of each type conforming to the cylindrical curvature of the platen.

5. In a machine for embossing a work-sheet with characters readable by the blind, the combination of individually movable embossing type-heads having unreversed Braille characters in relief, a sheet-backing cylindrical platen having a soft surface to be indented by the unreversed types and form a matrix for the sheet to emboss characters thereon readable by the sense of touch, and a carriage to effect letter-feeding movements between said platen and said type-heads.

6. In a machine for embossing a work-sheet with characters readable by the blind, the combination of individually movable embossing type-heads having unreversed Braille characters in relief, a sheet-backing cylindrical platen having a soft surface to be indented by the unreversed types and form a matrix for the sheet to emboss thereon characters readable by the sense of touch, individual gages upon said type-heads to limit the indenting of the sheet and platen by the types to produce embossings of uniform height throughout the page, and a carriage to effect letter-feeding movements between said platen and said type-heads.

7. In a machine for embossing a work-sheet with characters readable by the blind, the combination of embossing type-heads having unreversed Braille characters in relief, a sheet-backing platen having a soft surface to be indented by the unreversed types and form a character-connecting matrix for the sheet to raise characters readable by the sense of touch, and a surface binder for the soft platen-face to promote a closer fitting matrix for the type-indented work-sheet.

8. The combination with an embossing type-head having a type-character in relief, of a vulcanized rubber platen having a matrix-forming face that is self-forming to the type-character when embossing the character upon a work-sheet and self-restoring to its original shape after embossing the character, and re-enforcing fabric vulcanized into the platen-face.

9. The combination with an embossing type-head having a type-character in relief, of a vulcanized soft rubber platen having a matrix-forming face that is self-forming to the type-character when embossing the character upon a work-sheet and self-restoring to its original shape after embossing the character, and a woven silken fabric vulcanized into the platen-face.

10. A machine for embossing paper for blind readers, including a system of unreversed pit-forming Braille types to strike against the rear face of the work-sheet, a soft embossing platen to co-operate with all of said types, the types being rearwardly convergent and mounted upon radiating type-bars including a complete set of alphabet-types closely assembled side by side upon the tips of all the type-bars and normally printing, and a substantially smaller number of non-alphabetical characters upon certain type-bars and brought into use, at will, by effecting relative case shifting between the type-bars and the platen, said non-alphabetical characters being given sufficient room by being placed upon alternate type-bars in rear of said alphabetical types, and means for effecting a left to right letter-feeding movement of the platen and work-sheet at the operation of the types.

11. A machine for embossing paper for blind readers, including a system of unreversed pit-forming Braille types to strike against the rear face of the work-sheet, a soft embossing platen to co-operate with all of said types, the types being rearwardly convergent and mounted upon radiating type-bars including a complete set of alphabet-types closely assembled side by side upon the tips of all the type-bars and normally printing, and a substantially smaller number of non-alphabetical characters upon certain type-bars and brought into use, at will, by effecting relative case shifting between the type-bars and the platen, said non-alphabetical characters being given sufficient room by being placed upon alternate type-bars in rear of said alphabetical types, and means for effecting a left to right letter-feeding movement of the platen and work-sheet at the operation of the types, each type having a gage in the form of a pad-portion to contact with the platen to insure evenness of height of the embossing all over the work-sheet.

12. In a Braille embossing machine, a typewriter keyboard having Roman alphabetical letters in standard typewriter order thereon for the use of a reader able to see, unreversed Braille pit-forming types connected to the keys to strike and pit the back of a work-sheet, letter-feeding means controlled by the keys to cause the type-impressions to follow one another from right to left across the rear of the sheet, said types being mounted upon radial type-bars, the alphabetical types occupying the tips of the type-bars, a substantially smaller number of character-types occupying positions in rear of the alphabetical types, and means for effecting case-shift between the paper and the types, a small number of said keys having characters provided thereon corresponding to the case-shift characters and the combined Roman letters, and certain of the other keys having combined letters and numerals thereon, and connected to single character-types which are used for either alphabetical letters or numerals, without operating the case-shift means, and means to indicate which of the combined keys are single-type-character keys.

13. A Braille typing machine including a system of key-operated Braille unreversed types for forming pits in the back of a sheet, a platen of yieldable material to co-operate with the types in forming the pits, and means controlled by the keys for causing the type-impressions to follow one another from right to left across the back of the work-sheet, each of the types being provided with means co-operating with the surface of the platen around the pits, for limiting the depth of the pitting.

14. In a machine for embossing a work-sheet with typed characters for reading by finger touch, the combination of a revoluble platen in the form of a soft embossing cylinder forming a backing around which the work-sheet is held, a system of embossing types having in relief blunt, rounded Braille characters, keys connected to drive said types individually against the back of the work-sheet, said platen with the work-sheet being connected to feed towards the left at the operation of the keys, the platen being co-operative throughout its length with any of said types to emboss the characters, and means for securing uniform height of the embossing upon the work-sheet, said means being in the form of gages formed as shoulders upon the types to contact with the work-sheet backed by the platen, said shoulders placed to gage uniformly the height of the embossings produced in the sheet by the types.

15. In a machine for embossing a work-sheet with typed characters for reading by finger touch, the combination of a revoluble platen in the form of a soft embossing cylinder forming a backing around which the work-sheet is held, a system of embossing types having in relief blunt, rounded Braille characters, keys connected to drive said types individually against the back of the work-sheet, said platen with the work-sheet being connected to feed towards the left at the operation of the keys, the platen being co-operative throughout its length with any of said types to emboss the characters, and means for securing uniform height of the embossing upon the work-sheet, said means being in the form of gages formed as shoulders upon the types to contact with the work-sheet backed by the platen, said shoulders placed to gage uniformly the height of the embossings produced in the sheet by the types, said shoulders being concavely curved to match the platen, and projecting upwardly from the types in a direction circumferential of the platen.

JESSE A. B. SMITH.